May 12, 1964  P. WINCHELL  3,133,140
LENS COVER
Filed Sept. 23, 1960
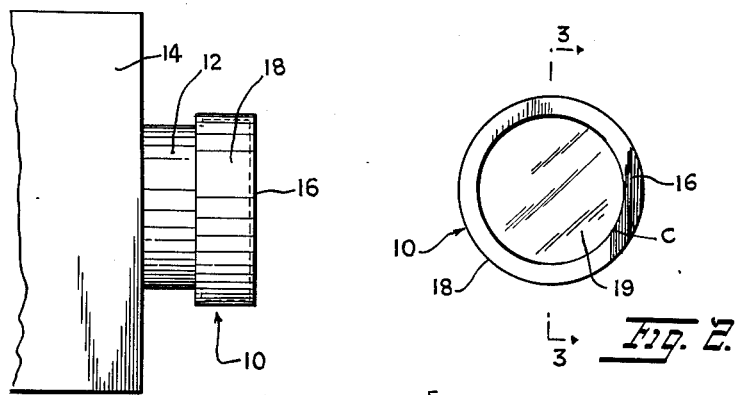
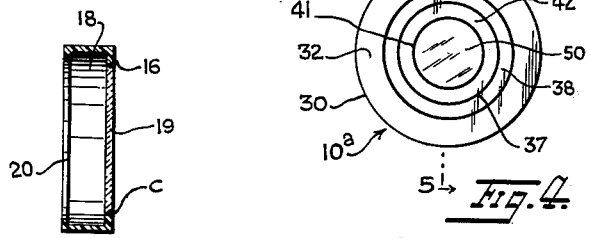
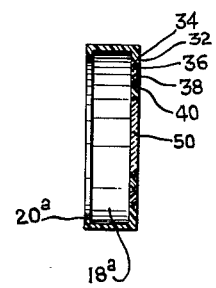
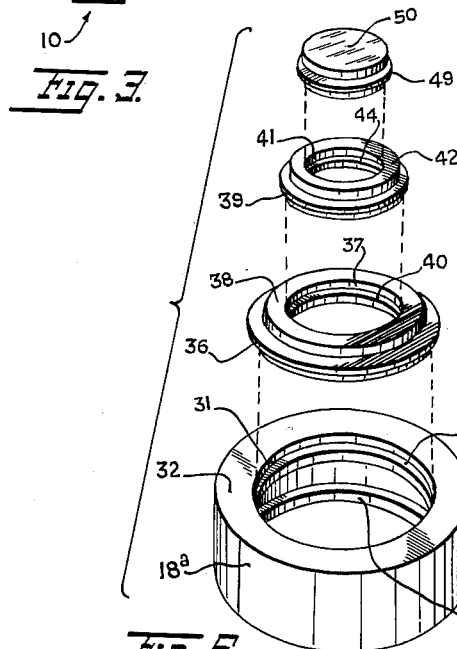
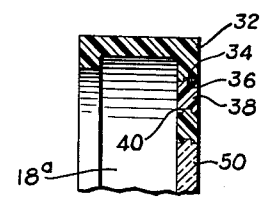
INVENTOR.
PAUL WINCHELL
BY
*Bolton P. Holecek*
ATTORNEY 3,133,140
LENS COVER
Paul Winchell, 9 Althea Lane, Larchmont, N.Y.
Filed Sept. 23, 1960, Ser. No. 58,098
1 Claim. (Cl. 88—1)

This invention concerns an improved lens cover for a camera or the like.

Heretofore, lens covers for cameras and other optical instruments have been made of rigid opaque material. The covers or caps have been provided with threads which were engaged with mating threads on the lens barrels of the optical instruments. This offered the disadvantage that a lens cover adapted for use with one lens barrel having one size of thread would not be usable with another lens barrel having a different size thread. A further disadvantage was the tendency of threaded caps to loosen and fall off. One particular difficulty encountered by photographers was the necessity of removing the lens cover before taking a picture. Frequently the photographer wished to have the camera ready for taking a picture instantly. This required leaving the lens cover off the lens barrel, and the lens was then unprotected. Sometimes the photographer would forget to remove the lens cover so that no picture was taken when the shutter was operated.

These and other difficulties and disadvantages of prior lens covers have been overcome in the present invention.

According to the invention there is provided a lens cover made of an annular flanged ring of flexible plastic material, preferably colored opaque, such as vinyl, polyethylene, acrylic or other synthetic resin. In the center of the ring is a disk of transparent plastic material of vinyl, acrylic or other synthetic resin. The materials of the ring and disk are preferably thermoplastic so that the disk can be fused in the center of the ring. The flange of the ring fits snugly and frictionally on camera lens barrels of various diameters, threaded or unthreaded, flanged or unflanged. In one form of the invention the flexible ring and disk are formed with a mating ridge and groove so that the disk is removable from the ring. Also, the flexible ring may be provided with one or more interfitting flexible coaxial spacer rings having interfitting ridges and grooves. A transparent disk is provided for fitting into any one of the outer or spacer rings, to provide a transparent window of any desired diameter in front of the lens. The flexible lens cover may be left on the lens barrel while the camera is in use, or can easily be removed due to its flexibility.

It is therefore one object to provide a flexible opaque lens cover in the form of an annular flanged ring with a central transparent window.

Another object is to provide a lens cover as described wherein the window is removably interfitted with the ring and snaps into and out of the ring for replacement by spacer rings and by windows of different diameters.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

FIG. 1 is a side elevational view of a portion of a camera, lens barrel and lens cover according to the invention.

FIG. 2 is a front elevational view of the lens cover per se.

FIG. 3 is a sectional view taken on line 3—3 of FIG. 2.

FIG. 4 is a front elevational view of another lens cover according to the invention.

FIG. 5 is a sectional view taken on line 5—5 of FIG. 4.

FIG. 6 is an exploded perspective view of components of the lens cover of FIG. 4.

FIG. 7 is a view similar to FIG. 5 showing the top portion thereof.

Referring to FIGS. 1–3, there is shown a lens cover 10 removably mounted on a lens barrel 12 of a camera 14 or other optical instrument. The lens cover includes a flat annular face plate 16, an integral cylindrical wall or skirt 18 and a radially extending inwardly directed annular flange 20. In the center of the face plate 16 is a transparent disk 19 of any suitable diameter. The entire body of the lens cover is preferably made of thermoplastic material which is flexible so that the flanged portion 20 and cylindrical wall 18 can be frictionally and elastically engaged on the cylindrical lens barrel 12 of the optical instrument. Disk 19 is formed of transparent plastic material and is fused into the center C of the lens cover to provide a transparent window thereat. This transparent disk 19 may also be integral with the face plate 16 of the lens cover; and the entire lens cover may be made of suitable transparent material. When the cover 10 is on the lens barrel 12 it serves as a shield against dust, dirt, scratching, finger marks, etc. In addition, the opaque portion of the lens cover serves as a light mask to limit the light passing into the lens barrel to the diameter of the central transparent portion 19.

The lens cover can instantly be snapped on and off the lens barrel 12. It can be left in place if desired while the camera or other optical instrument is in use. It requires no threads or other fittings to hold it on the lens barrel.

In the form of the invention shown in FIGS. 4–6, the lens cover 10ª includes an outer annular flexible plastic ring 30. Its front face plate 32 is formed with an inner groove 34 which receives an annular ridge 36 formed on the outer periphery of a flexible ring 38. Ring 38 has an inner groove 40 in the wall of aperture 41 which receives annular ridge 39 on the outer periphery of inner ring 42. Flexible ring 42 has an inner groove 44 which receives ridge 49 formed on the outer periphery of transparent disk 50. The outer ring body 30 has a cylindrical skirt 18ª and inner flange 20ª like skirt 18 and flange 20 of lens cover 10.

Rings 38 and 42 may be formed of flexible transparent, translucent or opaque synthetic resin plastic material for snapping into one another. The color of the plastic material will determine the filtering effect on the light admitted thtrethrough to the lens barrel on which the lens cover will be mounted. The outer ring 30 is preferably formed of opaque material. Disk 50 and ring 42 can be replaced by a larger transparent disk to fit in aperture 37 of ring 38. Also, disk 50, ring 38 and ring 42 can be replaced by a single transparent disk to fit in aperture 31 of ring 30. Thus, the size of the window admitting light through the lens cover may be adjustably determined.

The entire lens cover is instantly snapped on and off the lens barrel. It can be removed or left on the lens barrel during use of the optical instrument on which it is used. The lens cover may be fabricated by plastic molding methods much more economically than prior known threaded metal lens covers heretofore known.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A camera lens cover comprising a hollow flexible resin plastic cylindrical body including a flat circular annular face plate, with a central aperture, a cylindrical skirt integral with the outer periphery of said plate, a radially inwardly extending flange at the free end of said skirt, a flexible spacer ring removably fitted in said aperture, a second flexible spacer ring removably interfitted with the first-named spacer ring, and a transparent disk removably interfitted with the second spacer ring, said plate and each of the spacer rings having annular grooves interiorly thereof, said spacer rings and disk having annular ridges exteriorly thereof for fitting into the grooves in the plate and spacer rings, said face plate, spacer rings and disc being concentrically arranged, the outer faces of the face plate, the spacer rings and the disc having a common plane.

References Cited in the file of this patent

UNITED STATES PATENTS

| | | |
|---|---|---|
| 1,104,527 | Megown | July 21, 1914 |
| 2,182,585 | Green | Dec. 5, 1939 |
| 2,342,470 | Hunt | Feb. 22, 1944 |
| 2,431,172 | Harrison | Nov. 18, 1947 |
| 2,465,083 | Gradisar | Mar. 22, 1949 |
| 2,498,581 | Rogers | Feb. 21, 1950 |
| 2,504,255 | Lanauze | Apr. 18, 1950 |
| 2,953,970 | Maynard | Sept. 27, 1960 |
| 3,048,301 | Arpin | Aug. 7, 1962 |

FOREIGN PATENTS

| | | |
|---|---|---|
| 1,203,564 | France | Jan. 20, 1960 |
| 862,548 | Germany | Jan. 12, 1953 |